March 10, 1925.
M. R. HATCH
1,529,252
CLUTCH CONTROL MEANS
Filed Oct. 29, 1923
3 Sheets-Sheet 3
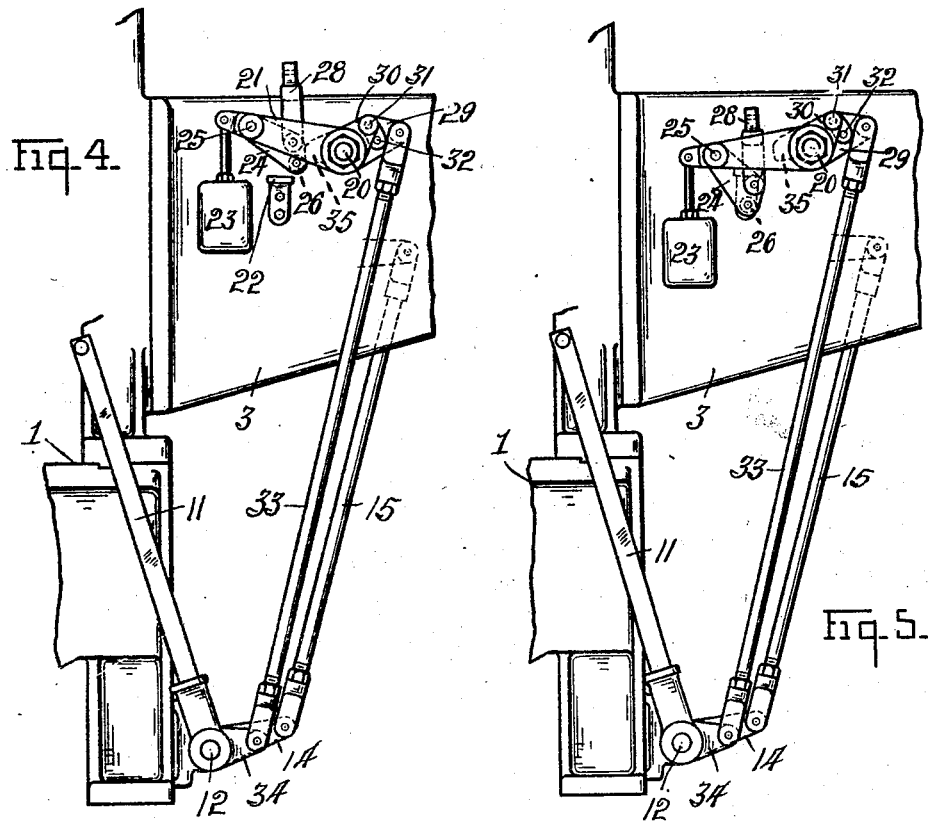
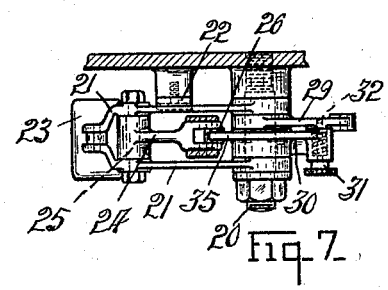
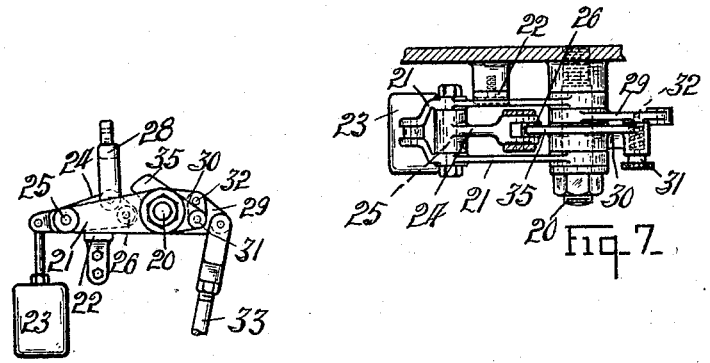
Inventor
Meredith R. Hatch
By Owen Owen & Crampton
Attorneys Patented Mar. 10, 1925.

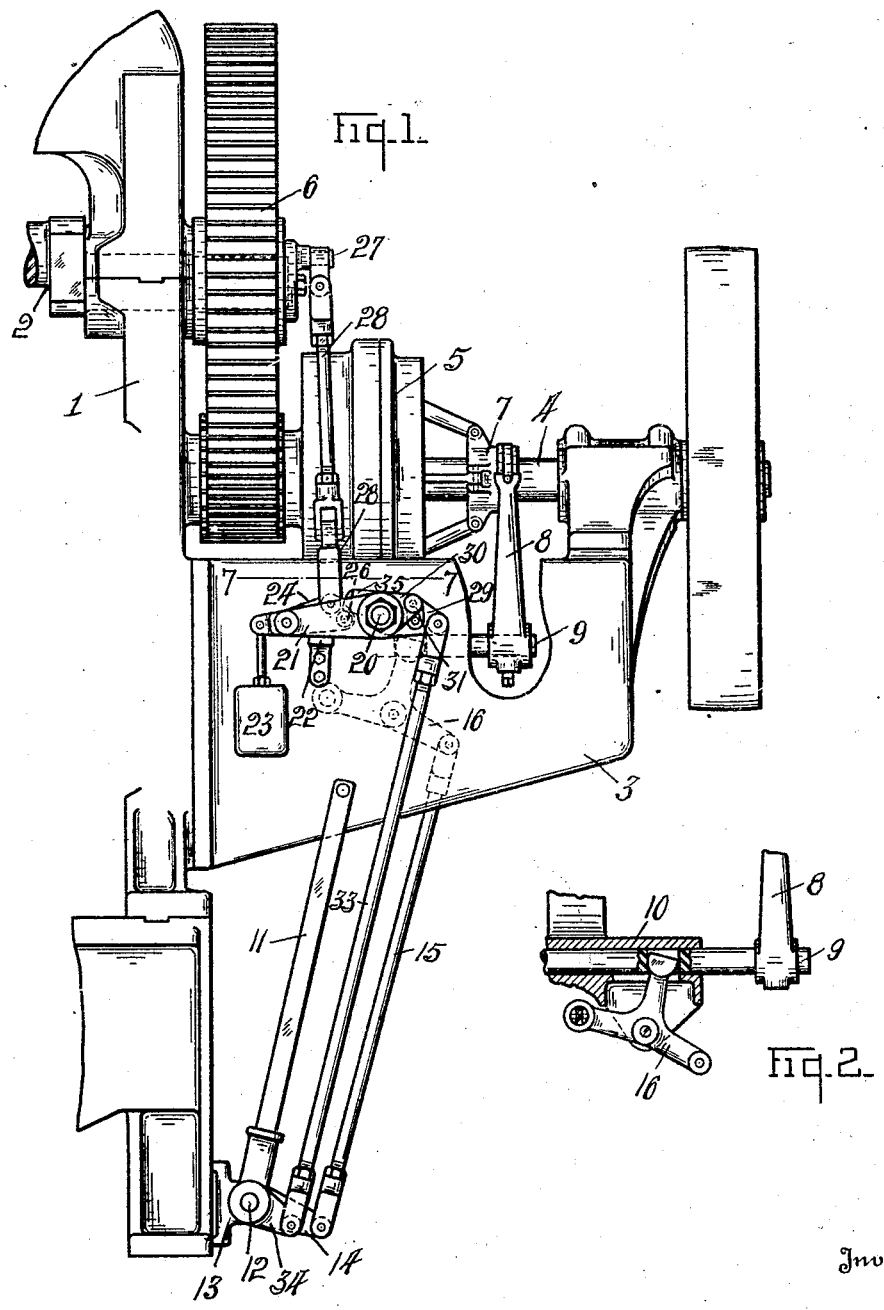

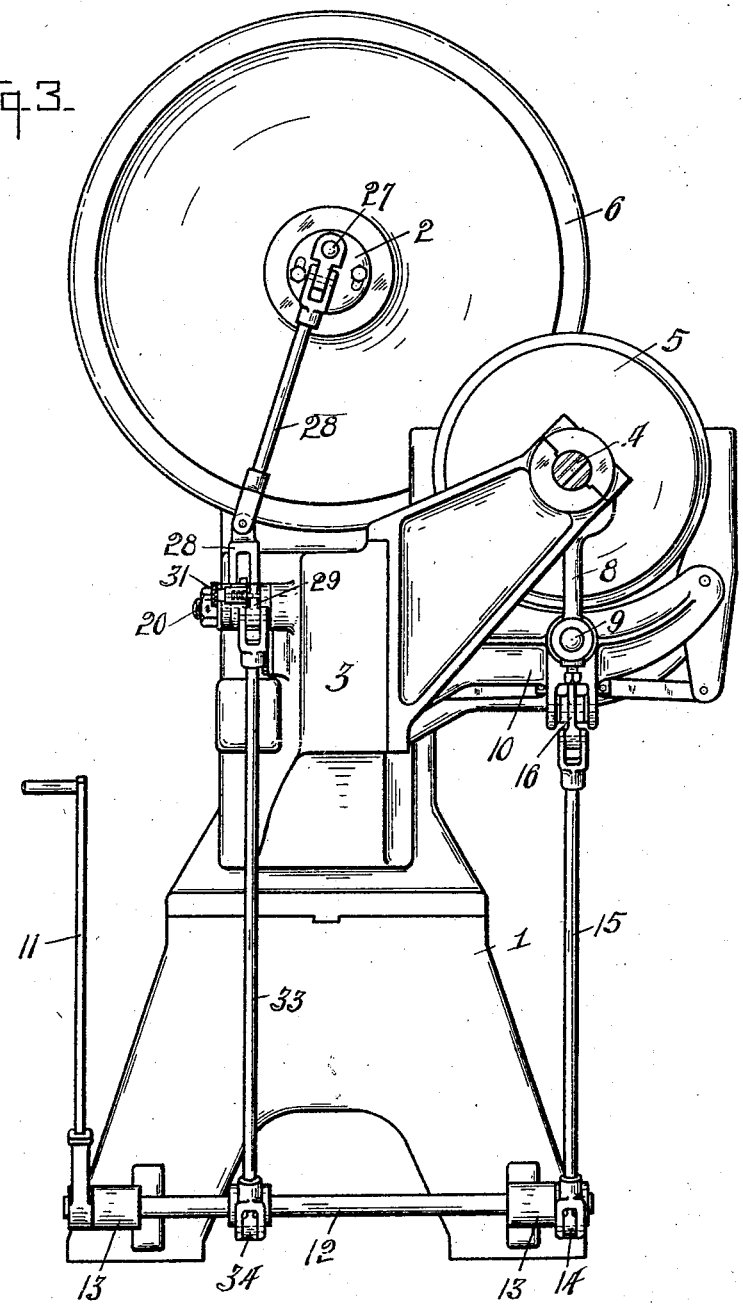

1,529,252

UNITED STATES PATENT OFFICE.

MEREDITH R. HATCH, OF TOLEDO, OHIO, ASSIGNOR TO THE TOLEDO MACHINE & TOOL COMPANY, OF TOLEDO, OHIO, A CORPORATION OF OHIO.

CLUTCH-CONTROL MEANS.

Application filed October 29, 1923. Serial No. 671,329.

*To all whom it may concern:*

Be it known that I, MEREDITH R. HATCH, a citizen of the United States, and a resident of Toledo, in the county of Lucas and State of Ohio, have invented a new and useful Clutch-Control Means, which invention is fully set forth in the following specification.

This invention relates to clutch control means of the type particularly intended for use in connection with the hand operated clutch control means of power presses or the like.

The object of the invention is the provision of a simple, efficient and novel means of the class described, which is connected to the manually operated clutch control means of an associated press and is capable of automatic operation to release the drive clutch of the press at or adjacent to the end of each cycle, or of being rendered inoperative at will with respect to the clutch control means whereby the press may run until stopped by a manual throwing out of the clutch. Further objects and advantages of the invention will be apparent from the following specification.

While the invention in its broader aspect is capable of embodiment in numerous forms, a preferred embodiment thereof is illustrated in the accompanying drawings, in which,—

Fig. 1 is a fragmentary front elevation of a power press with the mechanism embodying the invention in operative connection therewith and in clutch throw-out position. Fig. 2 is a fragmentary detail of a portion of the clutch throw-out means. Fig. 3 is a side elevation of the mechanism shown in Fig. 1. Fig. 4 is a detail of the automatic clutch throw-out mechanism in the position which it assumes when the control lever is thrown to operating position and when the present mechanism is at the beginning of a cycle of operations. Fig. 5 is a similar detail of the automatic clutch throw-out mechanism in the operative position which it assumes when the operating crank is at the lower end of its stroke. Fig. 6 is a similar detail with the automatic control mechanism rendered inoperative and in the starting position shown in Fig. 1, and Fig. 7 is a cross-sectional detail of the control mechanism taken substantially on the line 7—7 in Fig. 1.

Referring to the drawings, 1 designates the frame of a power press, 2 the customary crank or operating shaft, which in the present instance, is mounted in the top portion of said frame, 3 a bracket projecting from one side of the frame, 4 a power shaft journaled in said bracket and having a clutch 5 in driving connection with the shaft 2, in the present instance, through a train of gears 6. The engaging and releasing movements of the clutch illustrated are effected by a shifting of a collar 7 on the shaft 4, as is well understood in the art, and the movements of this collar are controlled by a shifter arm 8. which projects from a rod 9 that is mounted for longitudinal reciprocatory movements in an extension 10 of the bracket 3.

The hand controlled lever 11 for the clutch is mounted on a rock shaft 12 in convenient reach of the operator, said shaft being journaled in bearings 13 at the side of the frame 1 below the bracket 3. The shaft 12 is provided at one end with a rocker arm 14, which is connected by a link 15 to one arm of a bell-crank lever 16, which is mounted in the frame extension 10 below the rod 9 and has one arm engaging said rod to impart clutch operating movements thereto when the lever 11 is operated. The connection between the control lever 11 and the clutch 5, in the present instance, is such that when the lever is in the position shown in Fig. 1, the clutch is disengaged and when thrown to the left from such position to the positions indicated in Figs. 4 and 5, the clutch is thrown into engagement.

Nothing new is claimed for the mechanism above described, as it is common in one form or another in power presses. Such mechanism, or the type of machine to which applied, may vary materially without affecting the operation of the mechanism embodying the invention which will now be described.

A pivot stud 20 projects horizontally in the present instance, from the front side of the bracket 3 and a U-shaped yoke 21 is mounted thereon at the free ends of its arms for vertical rocking movements. A stop shoulder 22 on the bracket 3 coacts with the inner side arm of the yoke 21 to limit the downward movements thereof, and the outer or closed end of the yoke has a weight 23 attached thereto to cause it to normally bear down on said shoulder. A lever 24 is mounted in the yoke 21 between the arms thereof for vertical rocking movements relative thereto, and is pivoted at one end in the outer end portion of the yoke on a pivot pin 25. The opposite end of the lever 24 projects toward the stud 20 and is forked to carry a trip member engaging roll 26 therein. The lever 24 is connected to the wrist or crank-pin 27 on the adjacent end of the shaft 2 by links 28, which are pivotally connected to impart predetermined rocking movements to the lever 24 from a revolution of the wrist-pin 27. The connection of the links 28 with the lever 24 is slightly to the rear of the free end of such lever so that such point of connection is disposed between the roller 26 and lever fulcrum 25.

Two rocker-arms 29 and 30 are mounted for rocking movements on the stud 20 intermediate the arms of the yoke 21. These rocker arms are adjustably connected together by a manually controlled catch-pin 31 carried by the arm 30 and engaging in one of a set of apertures 32 in the arm 29, thus adapting the rocker-arms to act together as a bell-crank lever. The arm 29 is connected at its outer end by a rod 33 to an arm 34 fixedly projecting from the rock-shaft 12, whereby a rocking movement of the control lever 11 will communicate rocking movements to the arm 29 and through it to the rocker arm 30.

The rocker arm 30 has a trip nose 35 projecting therefrom toward the outer end of the yoke 21. When the arms 29 and 30 are in the adjusted relation shown in Figs. 1, 4 and 5, the trip nose 35 is adapted to be engaged by the roller 26 on the lever 24 during a predetermined portion of the rocking movements of said lever occasioned by a revolution of the wrist-pin 27. Such engagement of the roller 26 with the trip nose 35 takes place, in the present instance, during the last half or upward portion of a revolution of the wrist-pin 27 and causes a movement of the bell-crank lever 29, 30, which movement is in turn communicated to the rock shaft 12 to throw the control lever 11 to its off position shown in Fig. 1. When the rocker arms 29 and 30 are relatively adjusted as shown in Fig. 6 the trip nose 35 is disposed in inoperative relation to the roller 26 so that such roller may move throughout the entire arc of its permissible movement without striking the trip nose.

In the use of my invention the operator, if he desires to effect an automatic stopping of the press at the end of each cycle, places the pin 31 in the upper hole 32 of the set so as to dispose the rocker arms 29 and 30 in the relative positions shown in Figs. 1, 4 and 5. In starting an operation of the press it is only necessary for the operator to throw the control lever 11 to the left from the position shown in Fig. 1 to that shown in Fig. 4, thereby throwing the clutch 5 into engagement to effect a driving of the shaft 2, and also throwing the trip lever 29, 30 to the position indicated in Figs. 4 and 5. This movement of the lever causes the trip nose 35 to force the roller 26 and associated end of the lever 24 downward, which movement of the lever 24, due to the lever being fulcrumed on the lower end of the link connection 28, causes the opposite end of the lever 24 to be thrown up and to raise its yoke 21 therewith, the parts assuming the position shown in Fig. 4. During the downward stroke or first half of the revolution of the wrist-pin 27 the yoke 21 and lever 24 swing downward together until the movement of the yoke is arrested by contact with the stop 22, the lever 24 then continuing its downward movement alone until the wrist-pin has reached the limit of its downward movement, the position of the control parts at this point of the cycle being indicated in Fig. 5. When the wrist-pin during the upper stroke of its movement is near the top of such movement, the roller 26 engages under the trip nose 35 so that the connected arms 29 and 30 during the remainder of the up stroke of the wrist-pin are moved with the lever 24 to effect a return movement of the control lever 11 to its off position. When it is desired to run the press until stopped by a manual throwing-out of the control lever 11 the arm 30 is adjusted relative to the arm 29 to the position shown in Fig. 6, which prevents a tripping engagement of the roller 26 therewith.

I wish it understood that my invention is not limited to any specific construction, arrangement or form of the parts as it is capable of embodiment in numerous forms without departing from the spirit of the claims.

Having thus described my invention, what I claim as new and desire to secure by Letters Patent, is,

1. In combination, a drive member, a rotatable driven member, a clutch controlled driving connection between said members, control means manually operable to engage and release the clutch of said connection, a rocker member normally standing in one position of its movement, a lever carried by the rocker member in spaced relation to the rocking axis of the member, a connection between said lever and said driven member whereby a rocking movement is imparted to the lever from a rotation of the driven member, a trip means connected to said control means and operable by said lever during a predetermined portion of its movement to cause a movement of said control means from operative to inoperative position.

2. In combination, a drive member, a rotatable driven member, a clutch controlled driving connection between said members, control means manually operable to engage and release the clutch of said connection, a pivoted member, means for limiting the downward rocking movements of the pivoted member, a lever carried at one end by said pivoted member for rocking movements therewith and relative thereto, an operating connection between said lever and said driven member forming a fulcrum for the lever and operable to impart rocking movements to the lever from a rotation of the driven member, a trip lever adapted to be engaged and tripped by the first lever at a predetermined point in a rotation of said driven member, and a connection between said trip lever and said control means for throwing the control means from operative to inoperative position when the trip lever is moved by said first lever.

3. In combination, a drive member, a rotatable driven member, a clutch controlled driving connection between said members, control means manually operable to engage and release the clutch of said connection, a rocker mounted for rocking movements, means for limiting the rocking movements of the rocker in one direction, means resisting a rocking of the rocker in the opposite direction, a trip lever mounted for rocking movements relative to the rocker, a connection between the trip lever and the control means, and means connecting the said driven member and rocker adapted to cause a predetermined movement of the rocker from normal position when the control means is thrown to operative position and being operable by a rotation of said driven means to permit a return of the rocker to normal position and to effect a tripping of said trip lever at a predetermined point in a rotation of said driven member to cause a return of the control means to inoperative position.

4. In combination, a drive member, a rotatable driven member, a clutch controlled driving connection between said members, control means manually operable to engage and release the clutch of said connection, a rocker yoke normally rockable in one direction, means limiting the normal rocking movement of the yoke, a trip means having a rockable part and connected to the control means, and means connecting said driven member and yoke adapted to be acted on by said trip means to cause a movement of the yoke from normal position when the control means is thrown to operative position and being operable by a rotation of said driven member to return the yoke to normal position and to act on the trip means at a predetermined point in the rotation of said driven member to return the control means to inoperative position.

5. In combination, a drive member, a rotatable driven member, a clutch controlled driving connection between said members, control means manually operable to engage and release the clutch of said connection, a rocker yoke normally rockable in one direction, means limiting the normal rocking movement of the yoke, a trip means having a rockable part and connected to the control means, and means connecting said driven member and yoke adapted to be acted on by said trip means to cause a movement of the yoke from normal position when the control means is thrown to operative position and being operable by a rotation of said driven member to return the yoke to normal position and to act on the trip means at a predetermined point in the rotation of said driven member to return the control means to inoperative position, said trip means being adjustable to render it inoperative with respect to the means which is connected to and actuated by the driven member.

6. In combination, rotatable drive and driven members, a clutch controlled driving connection between said members, control means manually operable to engage and release the clutch of said connection, a rocker member and a trip lever having a common pivotal support, a connection between the trip lever and control means, means connecting said driven member and rocker member and including a lever pivoted to the rocker member in spaced relation to its rocking axis, said lever coacting with the trip lever to cause a predetermined movement of the rocker member from normal position when the control means is thrown to operative position, said lever being also operable upon a rotation of the driven member to return the rocker member to normal position and to engage and impart movement to the trip lever to effect a return of the control means to inoperative position when the driven member is at a predetermined point in a rotation thereof.

7. In combination, rotatable drive and driven members, a clutch controlled driving connection between said members, control means manually operable to engage and release the clutch of said connection, a rocker member and a trip lever having a common pivotal support, a connection between the trip lever and control means, means connecting said driven member and including a lever pivoted to the rocker member in spaced relation to its rocking axis, said lever coacting with the trip lever to cause a predetermined movement of the rocker member from normal position when the control means is thrown to operative position, said lever being also operable upon a rotation of the driven member to return the rocker member to normal position and to engage and impart movement to the trip lever to effect a return of the control means to inoperative position when the driven member is at a predetermined point in a rotation thereof, said trip lever being adjustable to render it inoperative with respect to the other lever.

In testimony whereof, I have hereunto signed my name to this specification.

MEREDITH R. HATCH.